US012795776B2

(12) United States Patent
Kumar et al.

(10) Patent No.: US 12,795,776 B2
(45) Date of Patent: Nov. 10, 2026

(54) METHOD AND SYSTEM FOR RELEASING PDU SESSION

(71) Applicant: Samsung Electronics Co., Ltd., Suwon-si (KR)

(72) Inventors: Lalith Kumar, Bangalore (IN); Mahmoud Watfa, Bangalore (IN); Koustav Roy, Bangalore (IN); Arijit Sen, Bangalore (IN); Danish Ehsan Hashmi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 18/042,732

(22) PCT Filed: Mar. 2, 2022

(86) PCT No.: PCT/KR2022/002919
§ 371 (c)(1),
(2) Date: Feb. 23, 2023

(87) PCT Pub. No.: WO2022/186591
PCT Pub. Date: Sep. 9, 2022

(65) Prior Publication Data

US 2023/0337323 A1 Oct. 19, 2023

(30) Foreign Application Priority Data

Mar. 2, 2021 (IN) ............................. 202141008817
Feb. 24, 2022 (IN) ............................. 202141008817

(51) Int. Cl.
*H04W 76/34* (2018.01)
*H04W 48/04* (2009.01)
*H04W 60/04* (2009.01)

(52) U.S. Cl.
CPC ........... *H04W 76/34* (2018.02); *H04W 48/04* (2013.01); *H04W 60/04* (2013.01)

(58) Field of Classification Search
CPC ..... H04W 76/34; H04W 48/04; H04W 60/04; H04W 8/02
See application file for complete search history.

(56) References Cited

U.S. PATENT DOCUMENTS 11,284,240 B2 * 3/2022 Kumar .................... H04W 8/22
2019/0007500 A1 1/2019 Kim et al.
(Continued)

FOREIGN PATENT DOCUMENTS

CN 110431911 A 11/2019
WO 2020166881 A1 8/2020

OTHER PUBLICATIONS

International Search Report and Written Opinion of the International Searching Authority dated Jun. 9, 2022, in connection with International Application No. PCT/KR2022/002919, 7 pages.
(Continued)

*Primary Examiner* — Diane D Mizrahi

(57) ABSTRACT

Present disclosure relates to a method and a UE for releasing PDU session. The UE identifies that the UE is in a restricted service area. Upon identifying that the UE is in the restricted service area, the UE releases PTI allocated by the UE and performs a local release of the PDU session. Further, the UE provides, to a network, information related to the PDU session, based on a subsequent trigger of a registration procedure.

10 Claims, 6 Drawing Sheets

(56) References Cited

U.S. PATENT DOCUMENTS

| | | | | |
|---|---|---|---|---|
| 2019/0223134 | A1 | 7/2019 | Park et al. | |
| 2019/0254089 | A1 | 8/2019 | Huang-Fu et al. | |
| 2019/0313478 | A1* | 10/2019 | Huang-Fu | H04L 47/2441 |
| 2020/0100319 | A1 | 3/2020 | Talebi Fard et al. | |
| 2020/0187144 | A1 | 6/2020 | Ying et al. | |
| 2020/0229069 | A1 | 7/2020 | Chun et al. | |
| 2020/0275513 | A1 | 8/2020 | Park et al. | |
| 2021/0168584 | A1* | 6/2021 | Li | H04W 60/00 |
| 2021/0274571 | A1* | 9/2021 | Kawasaki | H04W 8/186 |
| 2021/0282202 | A1* | 9/2021 | Vikberg | H04W 76/22 |
| 2021/0368373 | A1 | 11/2021 | Youn et al. | |

OTHER PUBLICATIONS

Examination report dated Oct. 11, 2022, in connection with Indian Application No. 202141008817, 7 pages.

Supplementary European Search Report dated Nov. 21, 2023, in connection with European Application No. 22763573.7, 7 pages.

Apple, "Local release of PDU session due to Service Area Restriction," C1-207211, 3GPP TSG-CT WG1 Meeting #127-e, Electronic meeting, Nov. 16-23, 2020, 11 pages.

Apple, Roland, C1-207211 "Local release of PDU session due to Service Area Restriction," 3 GPP TSG-CT WG1 Meeting #127-e Nov. 16-23, 11 pages.

The First Office Action date Mar. 25, 2026, in consultation with Chinese Patent Application No. 202280005811.3, 15 pages.

* cited by examiner

METHOD AND SYSTEM FOR RELEASING PDU SESSION

CROSS-REFERENCE TO RELATED APPLICATIONS

This application is a 371 National Stage of International Application No. PCT/KR2022/002919, filed Mar. 2, 2022, which claims priority to Indian Patent Application No. 202141008817, filed Mar. 2, 2021, Indian Patent Application No. 202141008817 filed on Feb. 24, 2022, and the disclosures of which are herein incorporated by reference in their entirety.

BACKGROUND

1. Field

The present disclosure is generally related to the field of network communication, more particularly, but not exclusively to a method and apparatus to release Packet Data Unit (PDU) session.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In mobile communication when a User Equipment (UE) is in the Long-Term Evolution (LTE) coverage or 5G system, a PDU session provides end-to-end user plane connectivity between the UE and a specific Data Network (DN) through User Plane Function (UPF). The PDU session supports one or more QoS flows.

Currently, existing systems do not deal with releasing a provided PDU session or an old PDU session in restricted areas. For example, if the UE is present in a non-allowed area/service restricted area, the UE is not allowed to trigger any SM signaling to release the PDU session. Typically, when the UE is in an allowed and non-restricted area, the UE performs local release of the PDU session and immediately informs a network about the release of the PDU session. However, informing to the network leads to unnecessary increase in signalling load on the network. For example, during emergency situations such as, earth quack or natural calamity, an area may be made as the restricted area which may generally be called as non-allowed area. In such situations, it may be important that the UEs are allowed to trigger registration procedure so that the network is aware where the UE is located. Thus, in case of emergencies, rescue person like police, fire fighter and so on may reach user. Hence, the UEs are allowed to trigger signaling related to the registration procedure but are not allowed to send or receive data. Currently, when data sending or receiving is blocked, applications in the UE assume there is an issue with connectivity of the PDU session to the data network through the UPF. Thus, in current UE implementations, application layers trigger PDU session reset procedure i.e., PDU session release and re-establishment procedure. Such procedures from the UEs may incur heavy signaling on the network. Due to this there is a potential that heavy signaling can be incurred on the network during emergency situation or in the restricted area which needs to be avoided. Further existing systems do not provide any method to release the PDU session in the service restricted area when the UE receives a trigger from an application layer to release the respective PDU session.

The information disclosed in this background of the disclosure section is only for enhancement of understanding of the general background of the invention and should not be taken as an acknowledgement or any form of suggestion that this information forms the prior art already known to a person skilled in the art.

SUMMARY

The present disclosure provides a method and an apparatus to release Packet Data Unit (PDU) session.

In an embodiment, the present disclosure relates to a method for releasing a Protocol Data Unit (PDU) session. The method includes identifying that the UE is in a restricted service area. Upon identifying that the UE is in the restricted service area, the method includes releasing a procedure transaction identify (PTI) allocated by the UE and performing a local release of one or more PDU sessions in the restricted service area. Further, the method includes providing, to a network, information related to the one or more PDU sessions, based on a subsequent trigger of a registration procedure.

In an embodiment, the present disclosure relates to a UE for releasing a Protocol Data Unit (PDU) session. The UE includes a processor and a memory communicatively coupled to the processor. The memory stores processor-executable instructions, which on execution cause the processor to release a Protocol Data Unit (PDU) session. The processor is configured to identify that the UE is in a restricted service area. Upon identifying that the UE is in the restricted service area, the processor is configured to release a procedure transaction identify (PTI) allocated by the UE and perform a local release of the one or more PDU sessions in the restricted service area. Further, the processor is configured to provide, to a network, information related to the one or more PDU sessions, based on a subsequent trigger of a registration procedure.

The foregoing summary is illustrative only and is not intended to be in any way limiting. In addition to the illustrative aspects, embodiments, and features described above, further aspects, embodiments, and features will become apparent by reference to the drawings and the following detailed description.

According to an embodiment of the present disclosure, the UE can release the PDU session even in the restricted service area.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 4:
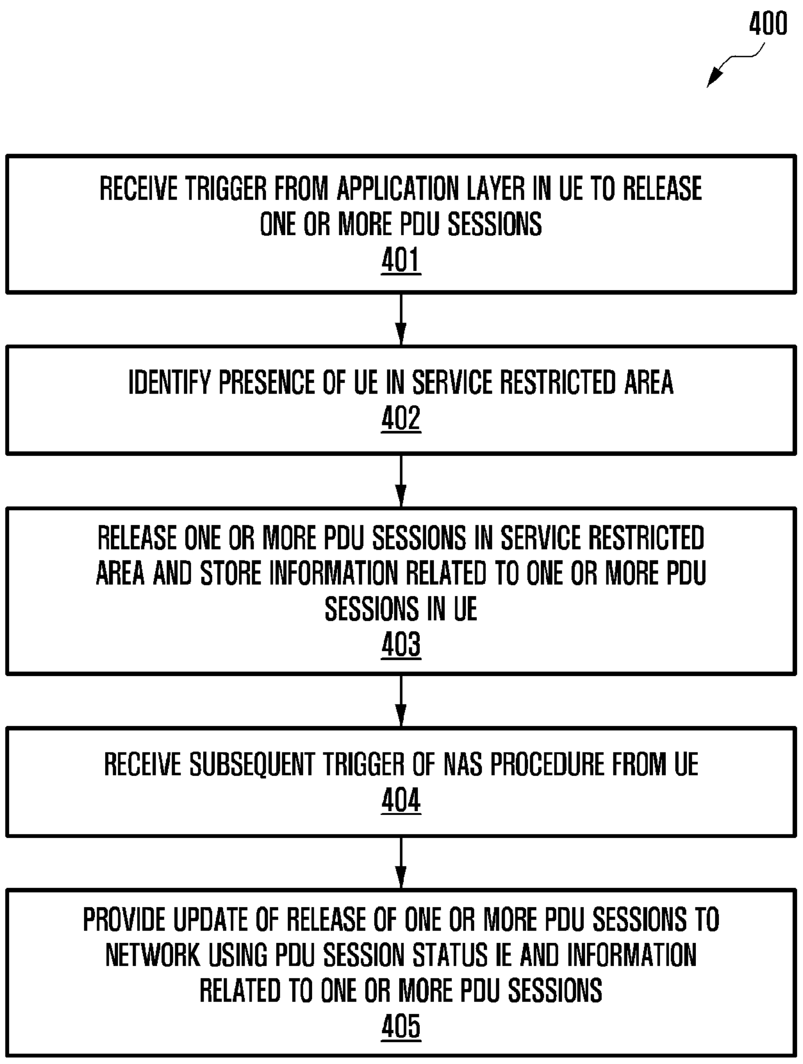
Figure 5:
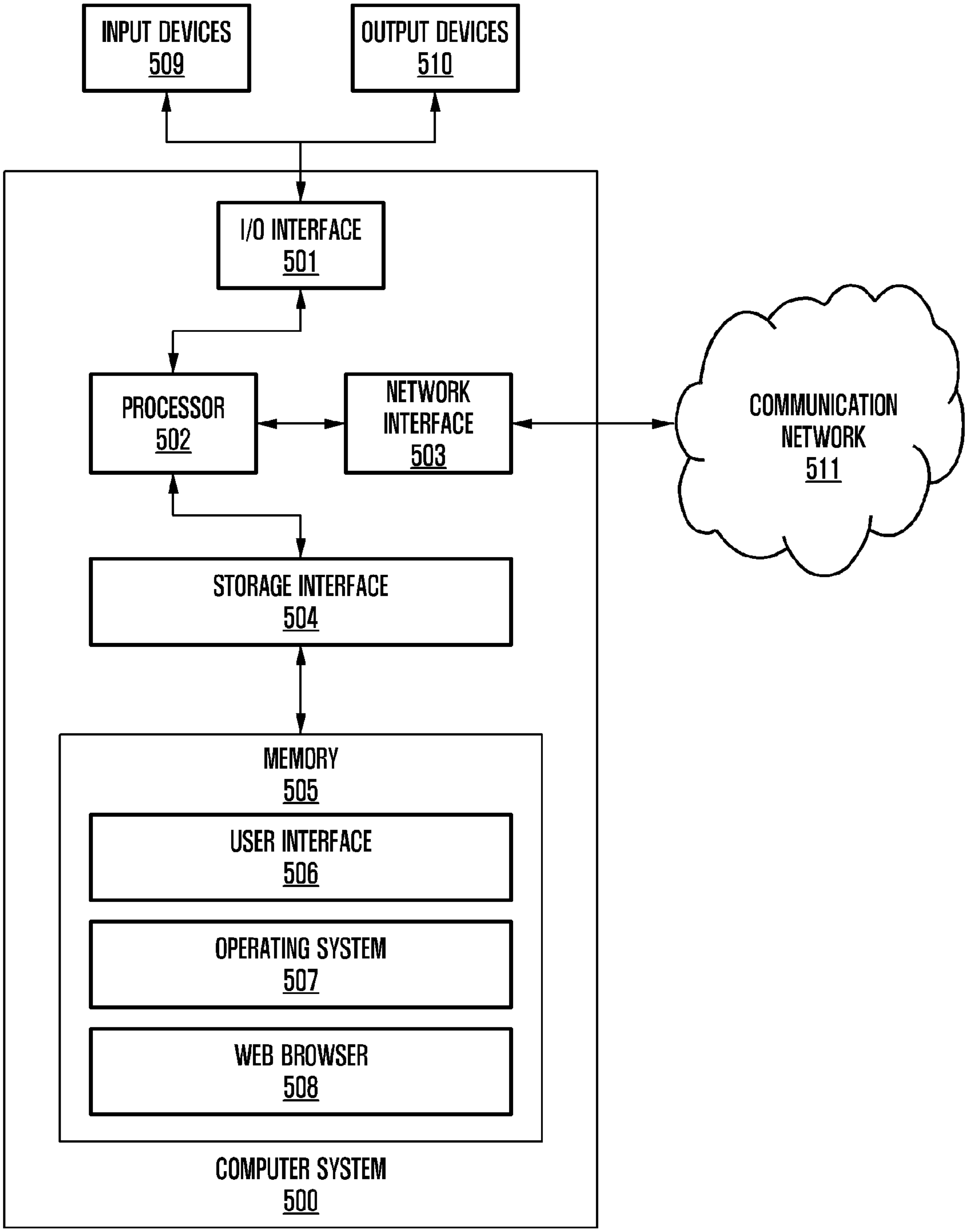

FIG. *3a* illustrates a sequence diagram for releasing a PDU session, in accordance with some embodiments of present disclosure;

FIG. *3b* illustrates a sequence diagram for releasing a PDU session, in accordance with some embodiments of present disclosure;

FIG. 4 illustrates a flow diagram showing an exemplary method for releasing a PDU session, in accordance with some embodiments of present disclosure; and FIG. 5 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprise", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "include", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a method and a UE for releasing a PDU session. Generally, when the UE is present in a service restricted area and an application layer of the UE sends trigger to release the PDU session, the UE is not allowed to send session management (SM) signaling to network for releasing the PDU session in the service restricted area. Therefore, the present disclosure discloses about releasing the PDU session locally in the service restricted area. Initially, when the application layer of the UE decides to release the PDU session, the UE may check if the UE is present in a service restricted area. Upon identifying the presence of the UE in the service restricted area the UE performs a local release of the PDU session in the service restricted area. The UE upon releasing the PDU session waits for a subsequent trigger of a NAS procedure in the UE to indicate to a network the release of the PDU session.

In yet another embodiment, when the UE is present in a service restricted area and an application layer of the UE sends trigger to release the PDU session, the UE waits to be moved from the service restricted area to a serviceable are. Upon moving from the service restricted area to the serviceable area, the UE releases the PDU session by triggering PDU session release procedure. Thus, the present disclosure is able to release PDU session in the service restricted area and update the status of released PDU session. As a result, the PDU session can be released locally without peer-to-peer signalling and helps the UE and the network to get synchronized with respect to the PDU session status.

Figure 1:
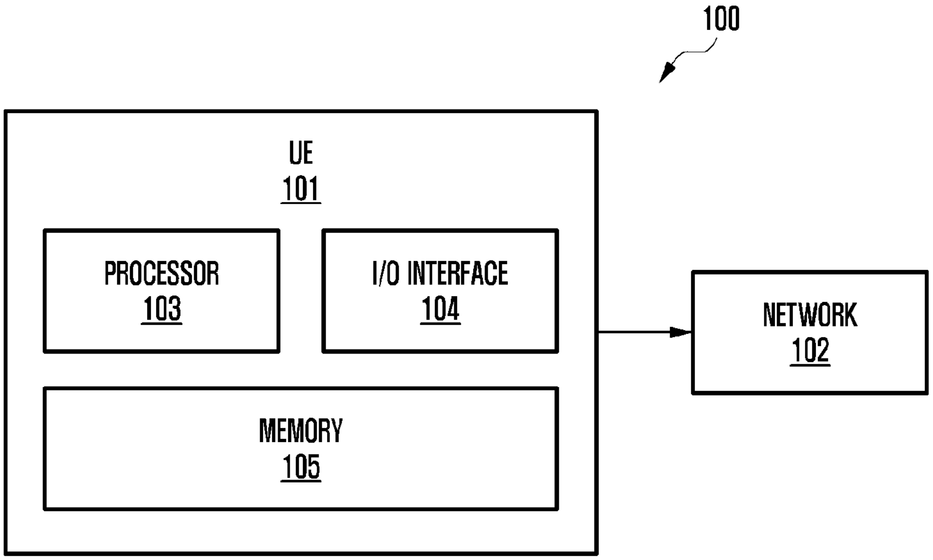
FIG. 1 shows an exemplary environment for releasing a PDU session, in accordance with some embodiments of the present disclosure.

FIG. 1 shows an exemplary environment 100 for releasing a PDU session. The environment 100 may include a UE 101, and a network 102. The UE 101 may include, but not limited to, mobile phone, a tablet, a smart phone, a laptop computer, a desktop computer, a Personal Computer (PC), a notebook and the like. The UE 101 communicates with the network 102 for releasing the PDU session. The network 102 may be an Access Mobility Management Function (AFM) which manages connection and session related information received from the UE 101. Further, the UE 101 may include a processor 103, I/O interface 104, and a memory 105. In some embodiments, the memory 105 may be communicatively coupled to the processor 103. The memory 105 stores instructions, executable by the processor 103, which, on execution, may cause the UE 101 to release the PDU session, as disclosed in the present disclosure.

In an embodiment, the UE 101 may communicate with the network via a communication network (not show in FIG. 1). In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like.

Typically, the UE 101 may receive a trigger from an application layer in the UE 101 to release one or more PDU sessions. Upon receiving the trigger, the UE 101 may identify presence of the UE 101 in a service restricted area. For example, a service restricted area may be an area where the UE 101 is not allowed to trigger any SM signaling. The service restricted area may include, but is not limited to, a military operation area, national security area, alert areas, and the like. The UE 101 when identified to be present in the service restricted area, i.e., the UE 101 is in a Tracking Area Identity (TAI) which is either a non-allowed area or not an allowed area. Further, upon identifying the presence of the UE 101 in the service restricted area, the UE 101 may release the one or more PDU sessions locally in the service restricted area. The UE 101 releases an allocated Procedure Transaction Identity (PTI) to release the one or more PDU sessions locally. The PTI is an identity which is allocated by the UE 101 for tracking and correlating UE requested ESM (EPS Session Management) procedures. The UE 101 stores information related to the one or more PDU sessions which are released. The information related to the one or more PDU sessions may include, but not limited to, identity details of the one or more PDU sessions Information Element (IE) status of the one or more PDU sessions. Upon releasing the one or more PDU sessions, the UE 101 may wait for trigger of a subsequent Non-Access Stratum (NAS) procedure. The NAS procedure may include, but is not limited to, a registration procedure, a service request procedure, and the like. The subsequent trigger of the NAS procedure occurs for instance, when the UE 101 moves out of a registration area, or if there is a change in UE capability, and the like. A person skilled in the art would understand that there may be one or more ways in which the NAS procedure may be triggered. Upon receiving the subsequent trigger of the NAS procedure, the UE 101 may provide an update of the release of the one or more PDU sessions to the network 102 using the PDU session status IE and the information related to the one or more PDU sessions. For example, consider that the UE 101 is in the service restricted area and receives the trigger of the NAS procedure like the registration procedure or the service request procedure and so on. The UE 101 may include the information related to the release of the one or more PDU sessions and update the network that the one or more PDU sessions are released as part of the PDU session status IE.

In an embodiment, when the UE 101 is present in a service restricted area and an application layer of the UE 101 sends trigger to release the PDU session the UE 101 waits to be moved from the service restricted area to a serviceable area. The serviceable area is an area where the UE 101 is allowed to trigger SM signalling. The serviceable area may also be called as allowed area. In such case, the UE 101 may detect that the UE 101 moved from the service restricted area to a serviceable area. Upon detecting, the UE 101 may release the one or more PDU sessions by triggering PDU session release procedure. The PDU session release procedure releases all resources associated with a PDU session. The resources may include, but is not limited to, IP address/prefixes allocated to the PDU session, and the like.

Figure 2:
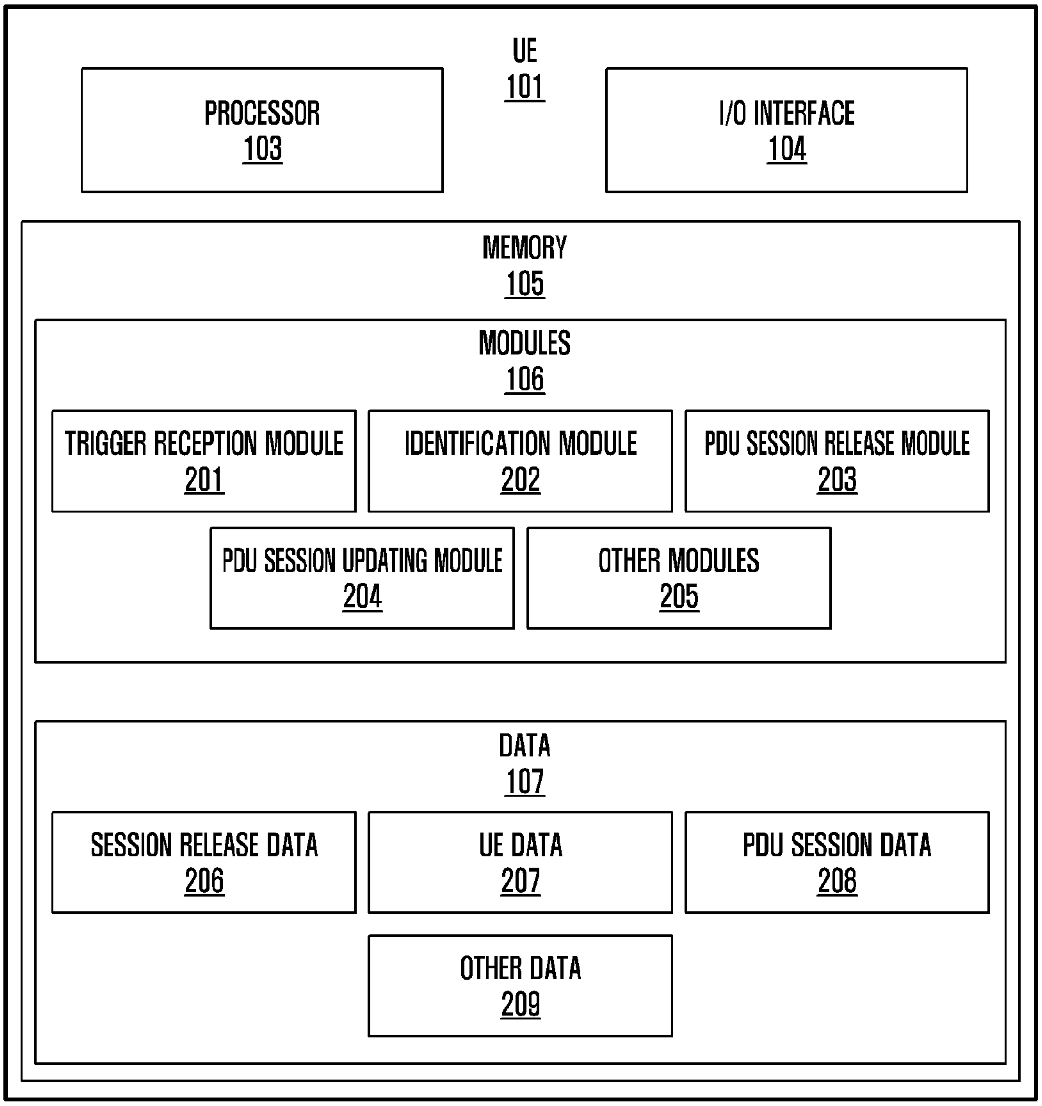
FIG. 2 shows a detailed block diagram of a UE for releasing a PDU session, in accordance with some embodiments of the present disclosure.

FIG. 2 shows a detailed block diagram of a UE for releasing a PDU session, in accordance with some embodiments of the present disclosure.

Data 107 and the one or more modules 106 in the memory 105 of the UE 101 is described herein in detail.

In one implementation, the one or more modules 106 may include, but are not limited to, a trigger reception module 201, an identification module 202, a PDU session release module 203, a PDU session updating module 204, and one or more other modules 205, associated with the UE 101.

In an embodiment, the data 107 in the memory 105 may include session release data 206, UE data 207, PDU session data 208, and other data 209 associated with the UE 101.

In an embodiment, the data 107 in the memory 105 may be processed by the one or more modules 106 of the UE 101. In an embodiment, the one or more modules 106 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 106 of the present disclosure along with the data 107 functions to release the PDU session.

The session release data 206 may include a message from an application layer of the UE 101 to release one or more PDU sessions.

The UE data 207 comprises data related to the presence of the UE 101 in a service restricted area. For example, the data may be '1' when the UE 101 is present in the service restricted area and '0' when the UE is not present in the service restricted area. A person skilled in art may appreciate that the data related to the presence of the UE may be represented in any other forms and is not limited to above mentioned example.

The PDU session data 208 may include information related to identity details of the one or more PDU sessions and Information Element (IE) status of the one or more PDU sessions.

The other data 209 may store data, including temporary data and temporary files, generated by modules for performing the various functions of the UE 101.

The trigger reception module 201 may receive a trigger from an application layer in the UE 101 to release one or more PDU sessions. The one or more PDU sessions provides an end-to-end user plane connectivity between the UE 101 and a specific Data Network (DN) through the User Plane Function (UPF). Upon receiving the trigger, the identification module 202 may scan the area and identify that the UE 101 is present in a service restricted area. Upon identifying that the UE 101 is present in the service restricted area, the PDU session release module 203 may release the one or more PDU sessions. Particularly, the PDU session release module 203 may release the PTI allocated in the UE 101 to release the one or more PDU sessions locally. Further, the PDU session release module 203 stores information related to the one or more PDU sessions in the UE 101.

Figure 3A:
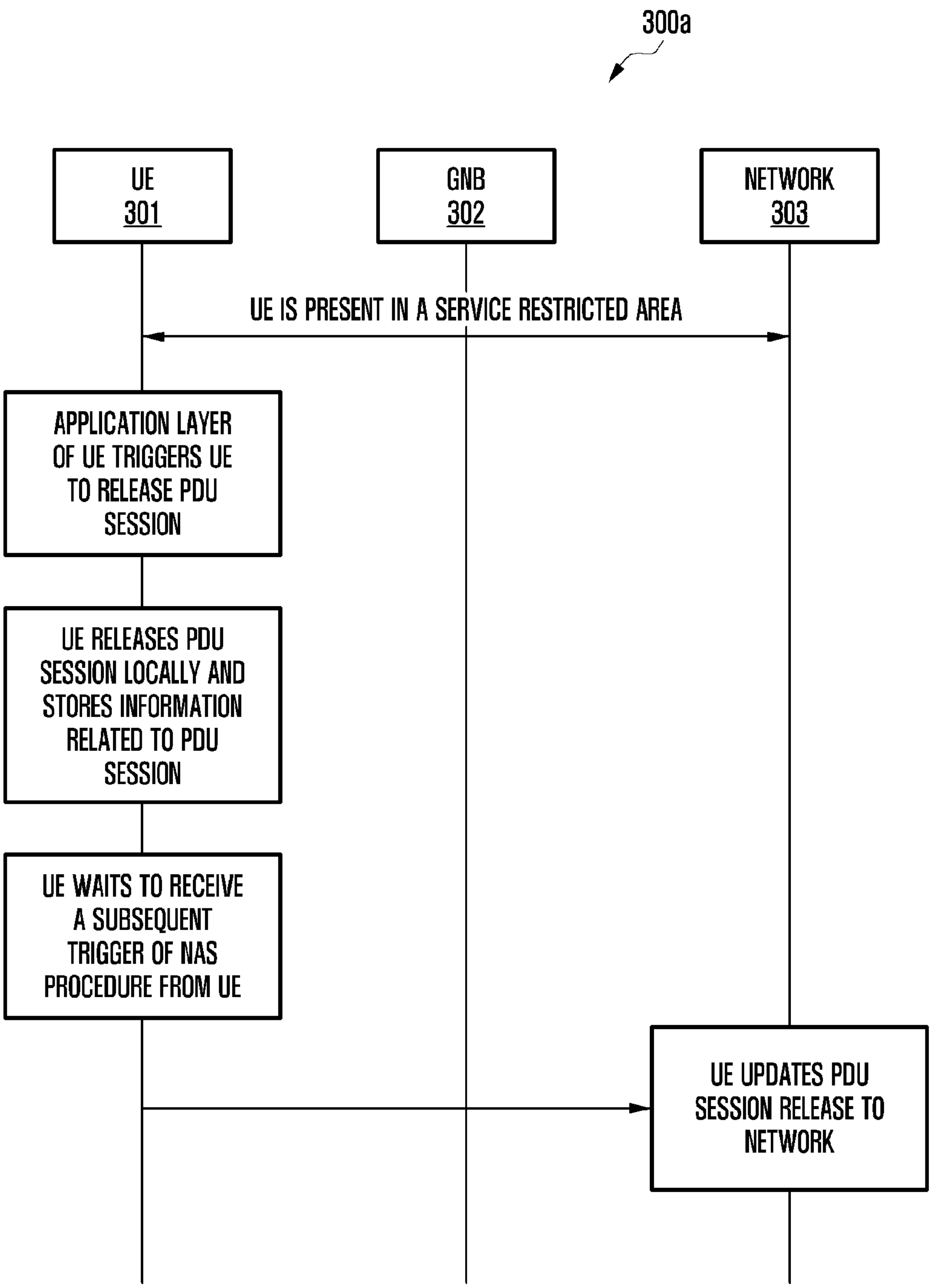

Upon releasing the one or more PDU sessions, the trigger reception module 201 may further check and wait for a subsequent trigger/next trigger of a NAS procedure. The subsequent trigger of the NAS procedure can occur for instance, when the UE 101 moves out of the registration area, or if there is a change in UE capability, and the like. A person skilled in the art may understand that the NAS procedure may occur for any known existing methods. Further, upon receiving the subsequent trigger, the PDU session updating module 204 provides an update of the release of the one or more PDU sessions to the network 102 using the PDU session status IE and the information related to the one or more PDU sessions, in response to the subsequent trigger of the NAS procedure. For example, consider FIG. 3*a* illustrating a sequence diagram for updating the release of the PDU session in the service restricted area. In an embodiment, the sequence diagram of FIG. 3*a* includes a UE 301, gNB 302, and a network 303. Consider, the UE 301 is present in the service restricted area such as military operation area and the application layer or modem layer of the UE 301 triggers to release the one or more PDU sessions. The UE 301 releases the PTI and releases the one or more PDU sessions locally and stores the information relate to the one or more released PDU sessions in the memory 105. The information related to the one or more PDU sessions may include identity details of the one or more PDU sessions and Information Element (IE) status of the one or more PDU sessions. Upon releasing the one or more PDU sessions, the UE 301 waits to receives a subsequent trigger of the NAS procedure from the UE 301. The NAS procedure comprises registration procedure, and service request procedure. The UE 301 upon receiving the subsequent trigger of the NAS procedure updates the network 303 such as the AMF the release of the one or more PDU sessions using the PDU session status Information Element (IE).

Figure 3B:
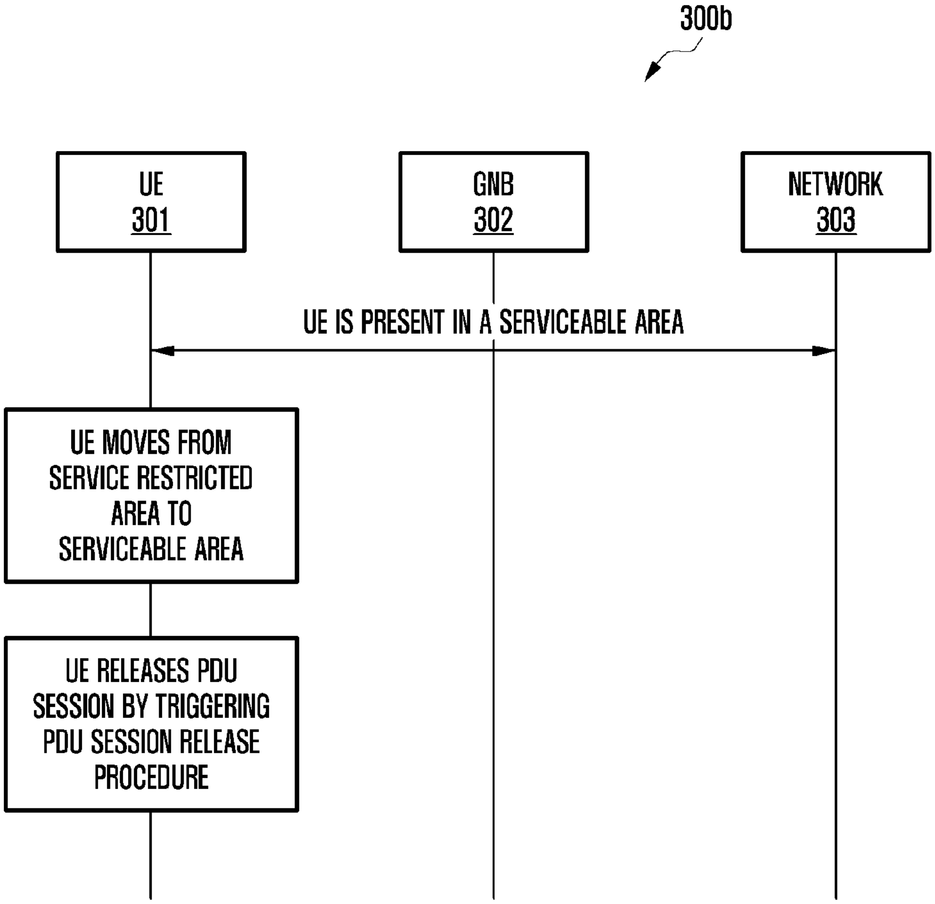

FIG. 3*b* illustrating a sequence diagram for releasing the PDU session in serviceable area. In an embodiment, the sequence diagram of FIG. 3*b* includes the ULE 301, the gNB 302, and the network 303. For example, consider when the ULE 301 is present in a service restricted area and the application layer of the UE 301 sends trigger to release the one or more PDU sessions. In such case, the UE 301 waits to move from the service restricted area to the serviceable area. Upon detecting that the UE 101 is moved from the service restricted area to the serviceable area, the ULE 301 releases the one or more PDU session by triggering the PDU session release procedure. The PDU session release procedure releases resources such as the IP address associated with the one or more PDU sessions.

The one or more modules 106 may also include other modules 205 to perform various miscellaneous functionalities of the UE 101. It will be appreciated that such modules may be represented as a single module or a combination of different modules.

FIG. 4 illustrates a flow diagram showing an exemplary method for releasing a PDU session, in accordance with some embodiments of present disclosure.

As illustrated in FIG. 4, the method 400 may include one or more blocks for executing processes in the UE 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, receiving, by the trigger reception module 201, trigger from the application layer of the UE 101 to release one or more PDU sessions.

At block 402, identifying, by the identification module 202, presence of the UE 101 in the service restricted area. The UE 101 is unable to release the SM signaling in the service restricted area.

At block 403, releasing, by the PDU session release module 203, the one or more PDU sessions in the service restricted area and storing information related to the one or more PDU sessions in the UE 101. Particularly, the releasing of the one or more PDU sessions comprises releasing of the PTI allocated in the UE to release the one or more PDU sessions. The information related to the one or more PDU sessions may include status information of the one or more PDU sessions and identity detail of the one or more PDU sessions. The status of the one or more PDU sessions may be 'inactive' i.e., the one or more PDU sessions are deactivated.

In an embodiment, consider when the UE 101 is present in the service restricted area and the application layer of the UE 101 sends trigger to release the one or more PDU sessions. The UE 101 waits to be moved from the service restricted area to the serviceable area. In such case, the UE 101 may detect that the UE 101 is moved from the service restricted area to the serviceable area. Upon detecting, the one or more PDU sessions may be released by triggering the PDU session release procedure. The PDU session release procedure may release all resources associated with a PDU session. The resources may include, but is not limited to, IP address/prefixes allocated to the PDU session, and the like At block 404, receiving, by the trigger reception module 201, a subsequent trigger of the NAS procedure from the UE 101. The NAS procedure comprises, the registration procedure, the service request procedure, and the like.

At block 405, providing, by the PDU session updating module 204, an update of the release of the one or more PDU sessions to the network 102 using the PDU session status IE and the information related to the one or more PDU sessions, in response to the subsequent trigger of the NAS procedure.

Computing System

FIG. 5 illustrates a block diagram of an exemplary computer system 500 for implementing embodiments consistent with the present disclosure. In an embodiment, the computer system 500 may be the UE 101 configured to release the PDU session. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with a network for releasing the PDU session. The network interface 503 may employ connection protocols include, but not limited to, direct connect, Ethernet (e.g., twisted pair 10/100/1000 Base T), transmission control protocol/internet protocol (TCP/IP), token ring, IEEE 802.11 a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, Common Gateway Interface (CGI) scripts, Java, JavaScript, PERL, PUP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for releasing the PDU session in service restricted area and updating the network upon receiving next trigger of the NAS procedure. Thus, helping to save the signaling on the network in the service restricted area which is not designed to receive heavy signaling.

An embodiment of the present disclosure provides a method for releasing the PDU session locally without peer-to-peer signalling and helps the UE and the network to get synchronized with respect to the PDU session status with reduced signalling load on the network during emergency situation or in the restricted area such as military and so on.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method performed by a user equipment (UE) in a wireless communication system, the method comprising:

identifying that the UE is in a restricted service area;

identifying one or more protocol data unit (PDU) sessions to be released;

waiting to release the one or more PDU sessions until the UE is not in the restricted service area; and releasing the one or more PDU sessions by triggering a PDU session release procedure, after identifying that the UE is not in the restricted service area, wherein the restricted service area is an area where the UE is not allowed to trigger any session management signaling.

2. The method of claim 1, further comprising:

releasing a procedure transaction identity (PTI) allocated by the UE;

performing a local release of a PDU session among the one or more PDU sessions in the restricted service area; and providing, to a network, information related to the PDU session, based on a subsequent trigger of a registration procedure, wherein the information related to the PDU session is provided using a PDU session status information element (IE) and comprises status information of the PDU session.

3. The method of claim 2, wherein the status information indicates whether the PDU session corresponding to the status information is inactive.

4. The method of claim 1, wherein whether the UE is in the restricted service area is identified based on a tracking area identity (TAI) which is either a non-allowed area or not an allowed area.

5. The method of claim 1, further comprising:

receiving, from an application layer in the UE, a trigger to release the one or more PDU sessions.

6. A user equipment (UE) in a wireless communication system, the UE comprising:

a processor (103); and a memory (105) communicatively coupled to the processor (103), wherein the memory (105) stores processor-executable instructions, which, on execution, cause the processor (103) to:

identify that the UE is in a restricted service area, identify one or more protocol data unit (PDU) sessions to be released, wait to release the one or more PDU sessions until the UE is not in the restricted service area, and release the one or more PDU sessions by triggering a PDU session release procedure, after identifying that the UE is not in the restricted service area, wherein the restricted service area is an area where the UE is not allowed to trigger any session management signaling.

7. The UE of claim 6, wherein the processor (103) is further configured to:

release a procedure transaction identity (PTI) allocated by the UE, perform a local release of a PDU session among the one or more PDU sessions in the restricted service area, and provide, to a network, information related to the PDU session, based on a subsequent trigger of a registration procedure, wherein the information related to the PDU session is provided using a PDU session status information element (IE) and comprises status information of the PDU session.

8. The UE of claim 7, wherein the status information indicates whether the PDU session corresponding to the status information is inactive.

9. The UE of claim 6, wherein whether the UE is in the restricted service area is identified based on a tracking area identity (TAI) which is either a non-allowed area or not an allowed area.

10. The UE of claim 6, wherein the processor is further configured to:

receive, from an application layer in the UE, a trigger to release the one or more PDU sessions.

* * * * *